(12) United States Patent
Øy

(10) Patent No.: US 11,119,241 B2
(45) Date of Patent: Sep. 14, 2021

(54) DOWNHOLE CALLIPER TOOL

(71) Applicant: Well ID AS, Sandnes (NO)

(72) Inventor: Lars Øy, Stavanger (NO)

(73) Assignee: Well ID AS, Sandnes (NO)

( * ) Notice: Subject to any disclaimer, the term of this patent is extended or adjusted under 35 U.S.C. 154(b) by 146 days.

(21) Appl. No.: 16/303,206

(22) PCT Filed: Jun. 15, 2017

(86) PCT No.: PCT/NO2017/050161
§ 371 (c)(1),
(2) Date: Nov. 20, 2018

(87) PCT Pub. No.: WO2017/217866
PCT Pub. Date: Dec. 21, 2017

(65) Prior Publication Data
US 2019/0203583 A1    Jul. 4, 2019

(30) Foreign Application Priority Data

Jun. 16, 2016   (NO) .................................... 20161021

(51) Int. Cl.
*G01V 3/30*  (2006.01)
*G01S 13/02* (2006.01)
(Continued)

(52) U.S. Cl.
CPC .............. *G01V 3/30* (2013.01); *E21B 47/085* (2020.05); *G01S 13/0209* (2013.01);
(Continued)

(58) Field of Classification Search
CPC ..... G01S 13/0209; G01S 13/26; E21B 47/085
See application file for complete search history.

(56) References Cited

U.S. PATENT DOCUMENTS

| 4,297,699 A | 10/1981 | Fowler et al. |
| 4,814,768 A * | 3/1989 | Chang ................. G01S 13/0209 |
| | | 324/333 |

(Continued)

FOREIGN PATENT DOCUMENTS

| WO | 2012/038734 | 3/2012 |
| WO | 2013/149308 | 10/2013 |

OTHER PUBLICATIONS

Andersen, N. et al. Nanoscale Impulse Radar. Novelda White Paper. Oct. 28, 2013 (https://www.ntnu.no/wiki/display/TrollLAGBS/Novelda+resources.

(Continued)

*Primary Examiner* — Marcus E Windrich
(74) *Attorney, Agent, or Firm* — Andrus Intellectual Property Law, LLP

(57) ABSTRACT

A downhole calliper tool is for measuring distance between the calliper tool and an interface in a well, such as a petroleum well or a geothermal well. The downhole calliper tool has an impulse radar system (of the CTBV-type) with at least one impulse radar unit configured for: a) transmitting electromagnetic pulses with the impulse radar unit in a direction away from the downhole calliper tool, and for b) receiving reflections of said electromagnetic pulses with the impulse radar unit, and for c) analyzing said reflections to determine the distance between the impulse system and the interface. The impulse radar system is designed for carrying out at least one distance determination per second, but preferably at least ten distance determinations per second.

17 Claims, 6 Drawing Sheets

(51) Int. Cl.
*G01S 13/89* (2006.01)
*G01S 13/87* (2006.01)
*G01S 13/88* (2006.01)
*E21B 47/085* (2012.01)
*G01S 13/26* (2006.01)

(52) U.S. Cl.
CPC .............. *G01S 13/26* (2013.01); *G01S 13/87* (2013.01); *G01S 13/885* (2013.01); *G01S 13/89* (2013.01)

(56) References Cited

U.S. PATENT DOCUMENTS

| | | | | |
|---|---|---|---|---|
| 6,525,540 B1* | 2/2003 | Kong | ........................ | G01S 7/03 324/338 |
| 9,157,315 B2* | 10/2015 | Bittar | ........................ | G01V 3/34 |
| 9,720,121 B2* | 8/2017 | Zhou | ........................ | G01V 1/44 |
| 9,879,521 B2* | 1/2018 | Wu | ........................ | G01V 3/26 |
| 2006/0102345 A1* | 5/2006 | McCarthy | ................ | G01V 3/30 166/250.1 |
| 2011/0227577 A1* | 9/2011 | Zhang | ................... | E21B 47/047 324/338 |
| 2013/0154846 A1* | 6/2013 | Mangione | ............. | G01S 13/885 340/854.6 |
| 2014/0032116 A1* | 1/2014 | Guner | ...................... | G01V 3/30 702/6 |
| 2015/0114714 A1* | 4/2015 | Dahl | .................... | E21B 49/005 175/40 |
| 2016/0116581 A1* | 4/2016 | Mohamadi | ......... | H01Q 21/0075 342/21 |
| 2016/0223669 A1* | 8/2016 | Assefzadeh | ............. | E21B 47/13 |

OTHER PUBLICATIONS

Norwegian Search Report, Norwegian Patent Application No. 20161021, date of completion Nov. 23, 2016.
International Search Report, PCT/NO2017/050161, dated Aug. 29, 2017.
Written Opinion, PCT/NO2017/050161, dated Aug. 29, 2017.

* cited by examiner

DOWNHOLE CALLIPER TOOL

CROSS-REFERENCE TO RELATED APPLICATIONS

This application is the U.S. national stage application of International Application PCT/NO2017/050161, filed Jun. 15, 2017, which international application was published on Dec. 1, 2017, as International Publication WO 2017/217866 in the English language. The International Application claims priority of Norwegian Patent Application No. 20161021, filed Jun. 16, 2016. The international application and Norwegian application are both incorporated herein by reference, in entirety.

FIELD OF THE INVENTION

The invention relates to a downhole calliper tool for measuring distance between the calliper tool and an interface in a well, such as a petroleum well or a geothermal well. The invention also relates to a drill string comprising such downhole calliper tool.

BACKGROUND OF THE INVENTION

Operators in the oilfield seek as much information as possible about downhole parameters and conditions. Such information can be characteristics of the earth formations surrounding the borehole, for example petrophysical parameters of the rock formations. Further, it is common to gather data relating to the size, shape and configuration of the borehole and drilling mechanical parameters.

The collecting of downhole data is often called logging or measurements and can be conducted in several ways including wireline logging, logging while drilling (LWD), logging while tripping (LWT), measurement while drilling (MWD) drill-pipe conveyed logging and coiled tubing logging. Logging while tripping is collecting of data while a so-called tripping operation is conducted, for example trip in hole, or trip out of hole. For this invention the term MWD (measurement while drilling) is intended to include, "measurement while drilling", "Logging While Drilling" and Logging While Tripping.

In wireline logging, sensors are mounted in a probe or pig and are lowered into the borehole after some or all of the drilling has been completed. The pig is connected to the end of a long cable or wireline. The wireline mechanically supports the pig. The wire transfers electricity and signals for operation of the probe. In some cases the probe has a battery and memory package and the wireline then only needs to supply mechanical support. Such a logging operation is sometimes called slickline. In this description wireline includes slickline operations.

In MWD the drilling assembly includes sensing and logging equipment that measures various parameters. The data can be stored in an internal memory or transferred to surface using telemetry, such as mud pulse technology or through wired drill pipe.

For the construction of a well it is desirable to have accurate information concerning the shape and size of the wellbore wall, for example for:
- calculating cement volume necessary to cement a pipe of casing in the wellbore;
- accurate location of tight spots and ledges which is useful information to optimize tripping of drill-string and running casing/tubing, and
- identify irregular hole shape which can be an identification of unstable formation.

In addition to the above-mentioned points, it may be desirable to have accurate information concerning the shape and size of the casing in the well. The internal diameter and shape of the casing give information about casing wear and potential casing damages that can compromise the integrity of the casing, which again can compromise the integrity of the well.

In MWD the sensors are typically connected to, or integrated in, the drill-string. A drill string is a pipe or conduit that is used to rotate a drill bit for drilling through subsurface rock formations to create a wellbore therethrough. It is typical to use threaded connections between the individual segments of drill-pipe that in total makes the drill string. The drill-string is normally operated by a drilling rig at surface, which rotates the drill-string and by adjusting the surface axial forces holding the drill-string, the drill-string can be moved up or down.

Tools that have been developed to measure internal diameter and shape of bore holes or tubulars are called calliper tools.

For MWD logging, the calliper technology is normally based on acoustic sensors. Due to the rotation of the drill-string and vibrations downhole, a mechanical calliper solution is not utilized for MWD, but normal technology for wireline logging.

For Wireline logging, the calliper technology is normally based on sensor in the form of mechanical arms such as disclosed in U.S. Pat. No. 8,484,858B2 and U.S. Pat. No. 7,389,828B2. The calliper tool measures the variation in borehole diameter as it is withdrawn from the bottom of the hole, using two or more articulated arms that push against the borehole wall. Each arm is typically connected to a potentiometer, which causes the resistance to change as the diameter of the borehole changes, creating a varying electrical signal that represents the changing shape of the borehole. This variation in output is translated into changes of diameter after a simple calibration and the calliper log is printed as a continuous series of values of hole diameter with depth.

Known MWD Calliper equipment known for use in drill strings includes acoustic travel time based devices. An acoustic transducer emits an ultrasonic pulse into the drilling fluid in the wellbore, and a travel time to the wellbore wall back to the transducer of the acoustic pulse is used to calculate the distance from the transducer to the wellbore wall. This technology is known to fail to function when drilling fluid having entrained gas. To give an accurate measurement, it is necessary to accurately determine the acoustic velocity of the drilling fluid proximate the calliper. For MWD there is normally no method to measure the acoustic velocity and an estimate is the normal way of solving this.

The sample rate on the existing MWD callipers is low. Sample rate means the time in between each sample is recorded. For example can a typical calliper sensor sample at every 10th second. This gives a low resolution on the logging, either while drilling or while tripping. To compensate for this slow sampling the drilling rate of penetration or the tripping speed can be reduced. Reducing ROP or tripping speed will reduce the progress on well construction is therefore expensive and undesired.

The cost for acoustic callipers are high and the industry are requiring more cost effective solutions. Therefore, there exists a need for other types of MWD wellbore callipers that can be used with drill strings.

For wireline mechanical callipers logging inside casing, there is a problem that the calliper will not distinguish between what is wax, scale and other deposits inside the casing and what is the actual casing. The current wireline callipers are also costly and require special trained operators. There is a need in the market for technology that can replace the mechanical wireline calliper.

SUMMARY OF THE INVENTION

The invention has for its object to remedy or to reduce at least one of the drawbacks of the prior art, or at least provide a useful alternative to prior art.

The object is achieved through features, which are specified in the description below and in the claims that follow.

In a first aspect the invention relates to a downhole calliper tool for measuring distance between the calliper tool and an interface in a well, such as a petroleum well or a geothermal well. The downhole calliper tool is a high bandwidth radar based upon a continuous time binary value design. The impulse radar system comprises an impulse radar system comprising at least one impulse radar unit configured for:
a) transmitting electromagnetic pulses with the impulse radar unit in a direction, preferably a radial direction, away from the downhole caliper tool, and for
b) receiving reflections of said electromagnetic pulses with the impulse radar unit, and for
c) analysing said reflections to determine the distance between the impulse radar system and the interface, wherein the impulse radar system is designed for carrying out at least 1 distance determination per second, but preferably at least 10 distance determinations per second.

The effects of the downhole calliper tool in accordance with the invention may be understood as follows. The calliper tool uses impulse radar system, which transmits electromagnetic waves (in impulses) towards the walls of the well or tubular (this is preferably done in the radial direction, but this is not essential, because any angle or tilt maybe taken into account and compensated for in the calculations). First of all, these electromagnetic waves travel at the speed of light, which is many order of magnitude higher than acoustic waves or mechanical articulated arms. This allows for much higher measurement frequencies, but also for much larger measurement distances. Furthermore, the speed of travelling of these electromagnetic waves is less dependent on the subject matter through which the waves travel, which makes the calliper tool much more accurate than acoustic calliper tools. The frequency of carrying out distance measurements is at least 1 per second, but preferably at least 10 per second, which not only allows for higher drilling rates or tripping speeds. Furthermore, the impulse radar system is a high bandwidth radar based upon a continuous-time-binary-value (CTBV) design. The advantage of this type of radar system is that it already has been effectively used in a completely different technical area, namely the medical field, as developed by Novelda AS. The inventor has realized that this type of radar can be conveniently used in a downhole calliper tool. The advantage of this type of radar is that is samples the reflections without using a clock. Reference is made to US 2013/0293275 A1, U.S. Pat. No. 9,030,243 B2, and US 2013/0181746 A1 for more information on this type of radar.

The word "interface" refers to a transition from one substance or matter to another substance or matter (having different properties), i.e. gas to liquid, gas to solid, liquid to solid, liquid to liquid (but different substances), liquid to gas, solid to gas, solid to liquid, and solid to solid (but different substances). For instance, when the calliper tool is used in a casing, the first interface may be oil to one or more of oil, wax, scale, or other deposits, and the second interface is this specific substance to the casing, the third interface is from casing to cement, and the fourth interface is from cement to formation.

In an embodiment of the downhole calliper tool in accordance with the invention the impulse radar system is configured for determining distances to multiple interfaces that are located in the well behind each other. With reference to the previous paragraph, this embodiment conveniently provides for measuring distance to multiple interfaces and not only the first one that is encountered, which is rendered possible by using impulse radar technology. By way of example concerning the different interfaces in an open hole that can be encountered are by the electromagnetic waves, there may be a first interface between the drilling mud and the cuttings left from the drilling operations. Then a second interface may be between the cuttings and the drilling mud filter cake. Then a third interface may be the difference between the drilling mud and the drilling mud filter cake. And a fourth interface can be between the drilling mud filter cake and the formation. An important remark at this stage is that not always the first encountered interface is the interface of interest.

In an embodiment of the downhole calliper tool in accordance with the invention the impulse radar system is configured for determining distances to said multiple interfaces by transmitting electromagnetic pulses having a predefined fixed frequency followed by determining respective distances to each of said respective interfaces by analysing the reflections within a predetermined time window complying with a predetermined time-of-flight of the electromagnetic pulses, wherein the predetermined time-of-flight complies with a predefined distance between the impulse radar system and the respective interface. This embodiment forms a first main variant to distinguish multiple interfaces at different distances. The idea behind this embodiment is that the impulse radar system can be tuned towards a certain investigation depth by setting the delay between the start of transmission of the electromagnetic pulse and the moment the reflections are analysed.

In an embodiment of the downhole calliper tool in accordance with the invention the impulse radar system is configured for determining distances to said multiple interfaces by transmitting electromagnetic pulses having different predefined frequencies followed by determining respective distances to each of said respective interfaces by analysing the reflections within different predetermined frequency spectrums complying with the predefined frequencies of the electromagnetic pulses, wherein each of said predefined frequencies is selected for a different interface. This embodiment forms a second main variant to distinguish multiple interfaces at different distances. The idea behind this embodiment is that the frequency of the emitted waves can be tuned towards the different interfaces and substances they have to cross in order to be able to measure the target interface with a higher signal to noise ratio, i.e. a larger reflection to arrive at the sensor of the impulse radar system. This second main variant can be combined with the first main variant.

In an embodiment of the downhole calliper tool in accordance with the invention the impulse radar system comprises a plurality of impulse radar units distributed around the circumference of the downhole calliper tool, each impulse radar unit being configured for measuring distance of respective interfaces in a different radial direction respectively. In order to have an efficient and accurate downhole calliper tool it is advantageous to measure distance in more than one directions, preferably at least three radial directions equally spread around the circumference of the tool. This embodiment conveniently provides that option. All impulse radar units may be used simultaneously for measurements, but they might also measure one after the other. In the case of the latter, interference (one radar unit measuring the reflection transmitted by another radar unit) between the different radar units may be reduced or avoided.

In an embodiment of the downhole calliper tool in accordance with the invention the impulse radar system comprises a further plurality of further impulse radar units distributed over the length of the downhole calliper tool, each impulse radar unit being configured for measuring distance of respective interfaces. The plurality of impulse radar units being distributed over the length of the downhole calliper tool may be exploited in different ways. The multiple radar units may either be used for redundancy purposes (fault tolerance) or they may be used to carry out measurement such that they are mapped to the same depth. In this way change in distance (or diameter) over time may be measured, i.e. it may be detected if the formation is instable.

In an embodiment of the downhole calliper tool in accordance with the invention each impulse radar unit comprises one transmitter-receiver for transmitting said electromagnetic pulses and receiving said reflections. In the case of the first main variant of detecting and measuring distance to multiple interfaces, the CTBV principle is used with this one transmitter-receiver. In the case of the second main variant of detecting and measuring distance to multiple interfaces, the CTBV principle with multiple frequency spectrums is used with this one transmitter-receiver.

In an embodiment of the downhole calliper tool in accordance with the invention each impulse radar unit comprises a plurality of transmitter-receivers for transmitting said electromagnetic pulses and receiving said reflections, each transmitter-receiver being configured for detection of at least one of said interfaces. The advantage of having multiple transmitter-receivers is that each unit can be tuned towards a specific interface, rendering the design less complex and more accurate.

In an embodiment of the downhole calliper tool in accordance with the invention the downhole calliper tool is designed to form part of one of a group consisting of: a drill-string, a downhole tractor, a wireline downhole tool, a slickline downhole tool, an MWD tool, a rotary steerable tool, a reamer, a hole opener and mud motor. The downhole calliper tool of the invention may be applied in various downhole applications as earlier discussed. For each of those applications the tool may need to be adapted, for instance when the tool forms part of a drill string to perform MWD then the requirement are quite different then when the calliper is to be implemented in a downhole tractor (i.e. for wireline applications). By way of further example, when the tool is to be used as a wireline or slick-line downhole tool the requirements may again be different. For each of those applications the tool needs to be tailor-made.

In an embodiment of the downhole calliper tool in accordance with the invention the electromagnetic pulses are transmitted in radial directions away from the downhole calliper tool.

An embodiment of the downhole calliper tool in accordance with the invention further comprises a control module, a memory for storing measurements, and power supply. The power supply may be carried out from the surface, provided by a battery or a combination of these two. If the tool is built in combination with a group of other downhole items, the power can come from a power supply in those items.

In an embodiment of the downhole calliper tool in accordance with the invention the measured distances at a certain depth are calculated back to an actual diameter or shape at said depth. In most logging application there is an interest to obtain information about the diameter of the hole of tubular. This embodiment uses the measured distances to calculate them back to the actual diameter.

In an embodiment of the downhole calliper tool in accordance with the invention all measurements are logged versus the actual depth, versus time or both.

In a second aspect the invention relates to a drill string comprising at least one downhole calliper tool according to the invention. If the drill string comprises more than one, the respective downhole calliper tools may be distributed over the length of the drill string.

An embodiment of the drill string comprises a first downhole calliper tool right after the drill bit, a second downhole calliper tool at a first distance, for instance 20 meters, from the drill bit, and a third downhole calliper tool at a second distance, for instance 500 meters, from the drill bit.

BRIEF INTRODUCTION OF THE DRAWINGS

In the following is described examples of preferred embodiments illustrated in the accompanying drawings, wherein:

FIG. 1 schematically illustrates a downhole calliper tool in accordance with the invention;

DETAILED DESCRIPTION OF THE EMBODIMENTS

The invention is about using an impulse radar technology for a downhole calliper tool in such a way that the downhole calliper tool takes many measurements, preferably at least one per second, but even more preferably at least 10 per second. The description herein after serves to illustrate various aspects of the calliper tool and how it functions. When it comes down to the radar technology as such not much details are given, because this knowledge is considered known as such. There exists even single-chip radar solutions these days.

Figure 1:
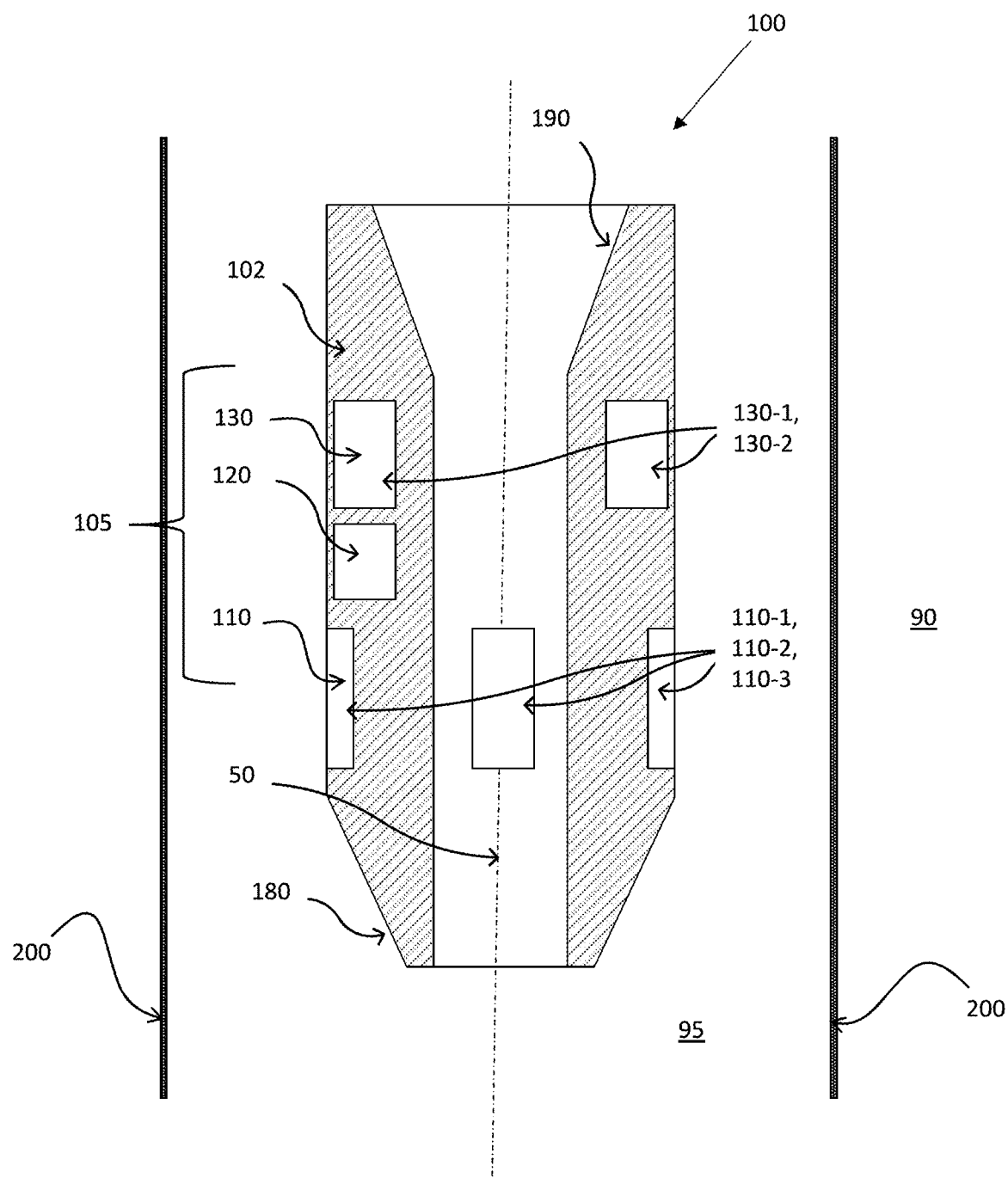

FIG. 1 schematically illustrates a downhole calliper tool 100 in accordance with the invention. This figure shows a downhole calliper tool 100, which can be used for Measurement While Drilling (MWD), Logging While Drilling (LWD), wireline- and slickline operations. Such a tool is typically formed as a tube such that drilling fluid can be pumped through it in a centre region. Typical diameter of such equipment is between 4.75 inch (120.65 mm) and 9.5 inch (241.3 mm). The tool may also be formed as a wireline or slickline tool, where it has the form of an intelligent pig (Norwegian "sonde") which can be descended in the well with a wire. FIG. 1 schematically illustrates an earth formation 90 in which a well or bore hole 95 is formed. There may be a tubular (such as a casing) placed in the bore hole. In a centre 50 of the bore hole 95 there is located the downhole calliper tool 100. The downhole calliper tool 100 comprises a hollow body 102, generally made of steel, which has pin end threads 180 for connecting with a drill pipe segment (not shown) and box end threads 190 for connecting with another drill pipe segment. The downhole calliper tool 100 may effectively form part of a drill string in a robust manner such that it does not weaken the drill string. The calliper tool 100 comprises an impulse radar system 105, which comprises an impulse radar 110 comprising a plurality of impulse radar units 110-1, 110-2, 110-3 of the CTBV-type (in this example four of which only three are shown) distributed around a circumference of the tool 110. In this embodiment, each impulse radar unit consist of one transceiver (TX) and one receiver (RX). The impulse radar units 110-1, 110-2, 110-3 are configured for transmitting electromagnetic pulses and receiving reflections of those pulses. Said units controlled by a control module 120, which receives power from a battery module 130. The battery module 130 comprises a plurality of batteries 130-1, 130-2 as illustrated.

The MWD impulse radar calliper will be installed together with a control module, memory and battery pack (which is just an example of a power supply, in case power is supplied from the service or from another tool, the battery pack may be dispensed with). All this will be integrated in a tubular or similar, placed downhole in the drill string. The high sample rate and accuracy will be achieved by utilizing impulse radar technology set up to sampling at multiple depth.

Figure 2:
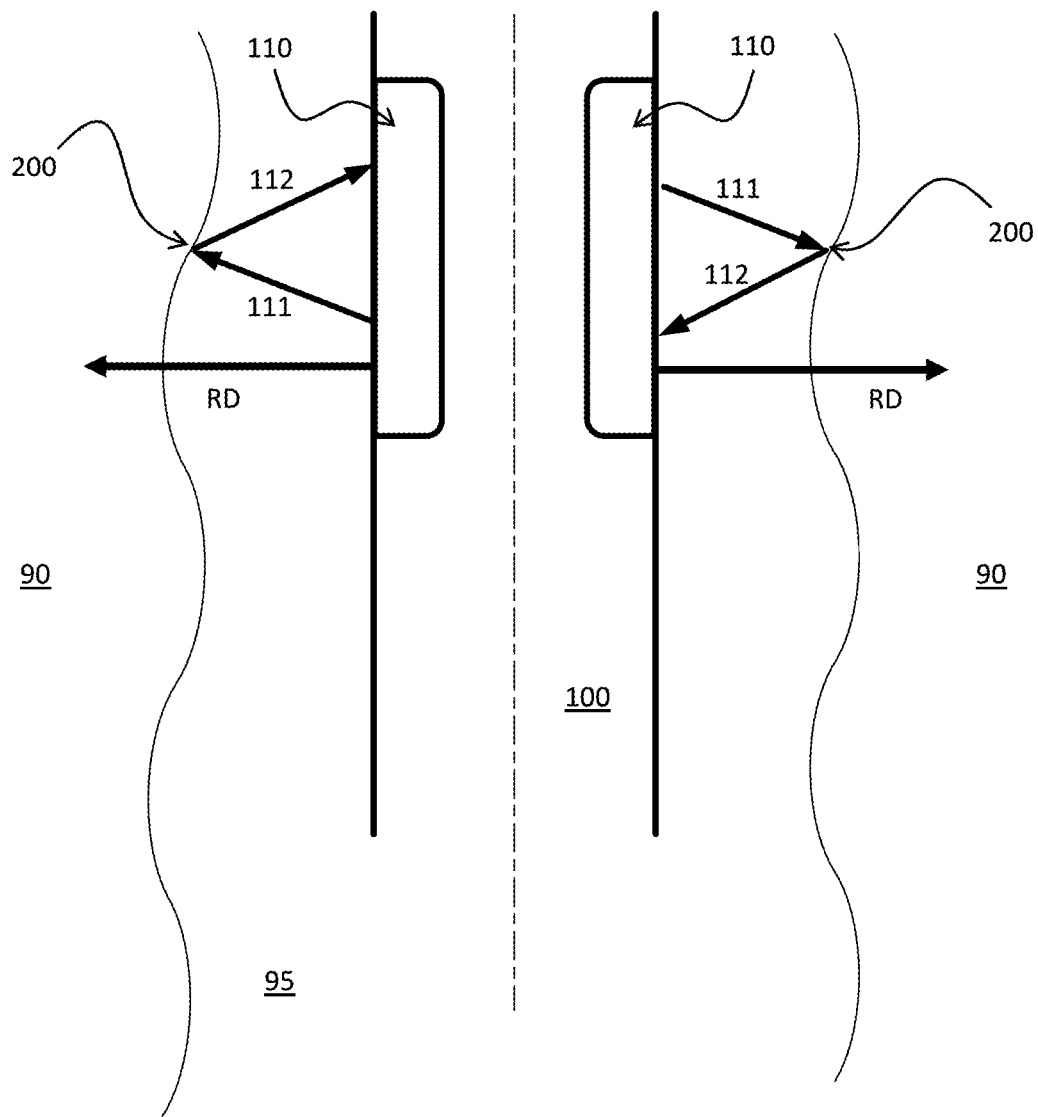
FIG. 2 shows how the downhole calliper tool of FIG. 1 may be used to measure standoff.

FIG. 2 shows how the downhole calliper tool 100 of FIG. 1 may be used to measure standoff. Standoff is the distance between the impulse radar unit and the formation. This measurement is used to calculate hole size (or diameter). The figure illustrates how the downhole calliper tool 100 emits electromagnetic pulses 111 to the formation 90 and receives reflections 112 after that the electromagnetic pulses 111 have reflected on an interface 200 formed by the well bore sidewall. The arrows in FIG. 2 have been drawn angled in a strongly exaggerated manner. The main idea is to measure the distance for each depth in the radial direction RD as illustrated by the two radial arrows. It is possible to use radar units that use the same transmitter-receiver for transmission and reception of electromagnetic waves.

Figure 3:
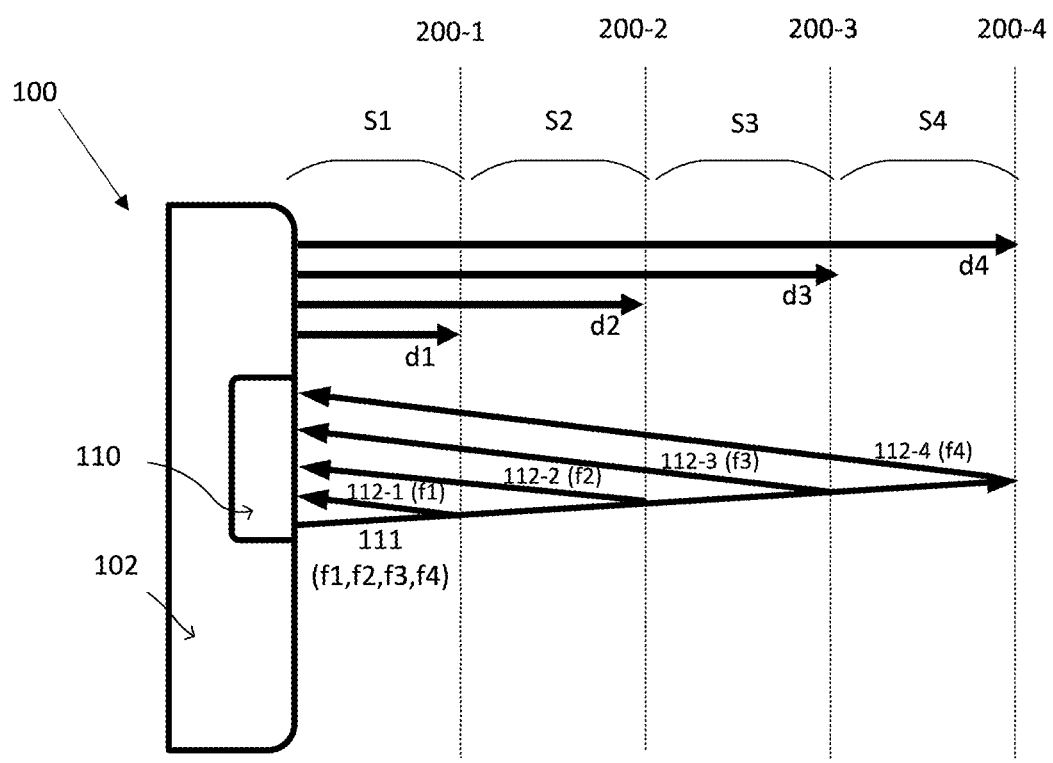
FIG. 3 shows how the downhole calliper tool of FIG. 1 may be used to measure multiple interfaces behind each other and different depths.

FIG. 3 shows how the downhole calliper tool 100 of FIG. 1 may be used to measure multiple interfaces behind each other and different depths. Radar technology is very suitable for see-through purposes, i.e. to determine multiple interfaces 200-1 . . . 200-4 that are located one behind the other. This figure illustrates very schematically that there is 4 different regions with four different substances or matters S1, S2, S3, S4. Between said regions there is a respective interface 200-1, 200-2, 200-3, 200-4 as illustrated. Each respective interface 200-1 . . . 200-4 resides at a different distance d1 . . . d4 as illustrated by the four radially extending arrows. The transmitted electromagnetic pulses 111 may reflect on each of said interfaces as illustrated. So, in this particular example a single electromagnetic pulse 111 may result in four different reflections (reflected pulses) 112-1, 112-2, 112-3, 112-4, arriving at four different time instants. In one embodiment of the calliper tool 110 the transmitted electromagnetic pulse 111 comprises only one frequency or frequency band f1. In another embodiment of the calliper tool 110 different frequencies or frequency bands f1, f2, f3, f4 are used as illustrated. The main idea behind this embodiment is that the respective frequencies may be tuned towards the targeted interface 200-1 . . . 200-4 between different substances or matters S1 . . . S4.

Figure 4:
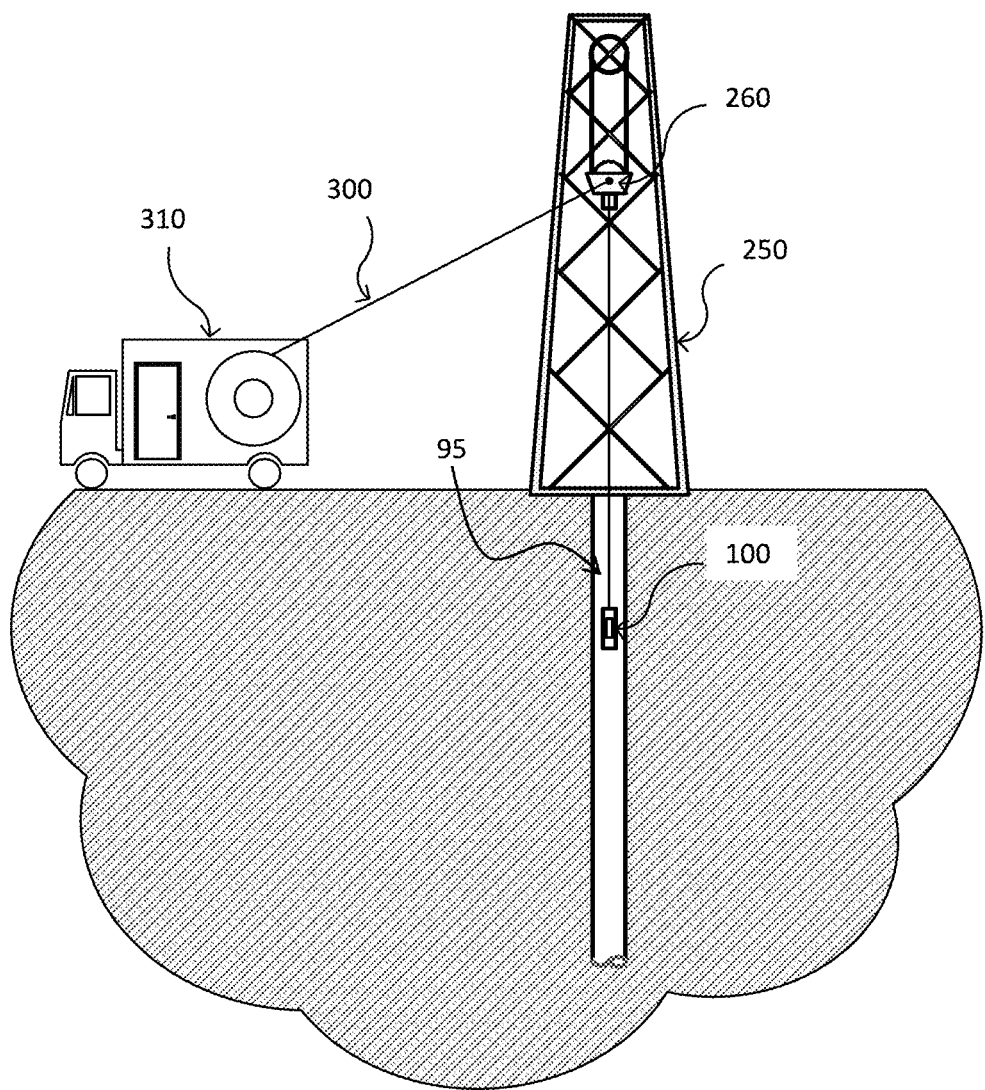
FIG. 4 shows a typical set-up for a wireline logging operation, where the invention may be used.

FIG. 4 shows a typical set-up for a wireline logging operation, where the invention may be used. In this embodiment the downhole calliper tool is provided in the form of an intelligent pig 100 that is suspended in a wireline 300 that runs via a hoisting block 260 in a derrick 250 to a wireline unit 310. The wireline unit 310 may be a mobile unit, i.e in the form of a truck, or it may be stationary in the form of a container. The intelligent pig 100 may be lowered into the well bore 95 as illustrated to carry out wireline logging (WL), i.e. measurement of the bore hole diameter as a function of the depth. In FIG. 4 the derrick 200 is placed onshore, but this is not essential to the invention.

Figure 5:
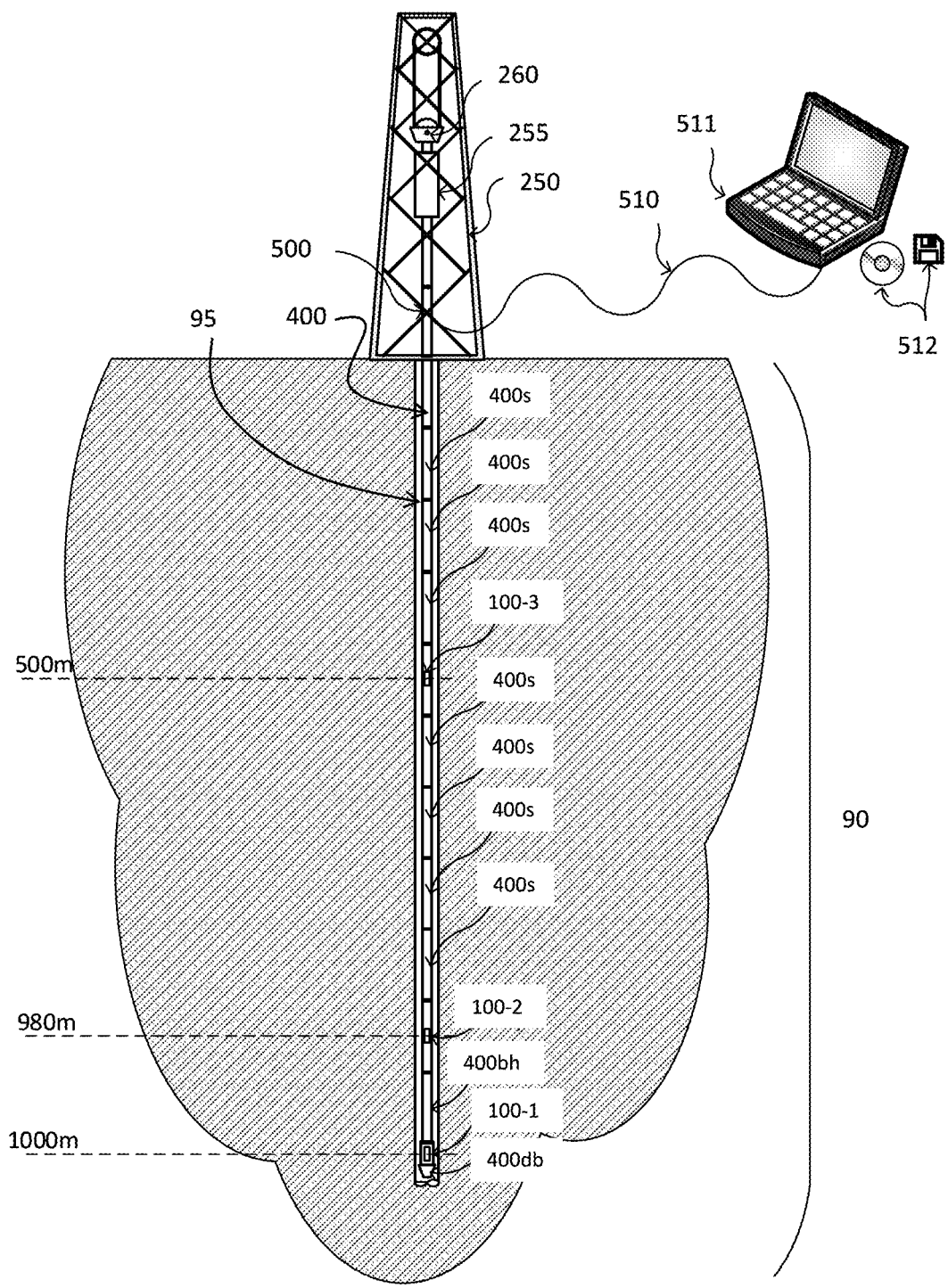
FIG. 5 shows a typical set-up for a MWD logging operation, where the invention may be used.

FIG. 5 shows a typical set-up for a MWD logging operation, where the invention may be used. In this embodiment multiple downhole calliper tools are provided in a drill string 400 for measuring the bore hole diameter as a function of the depth. A first calliper tool 100-1 is provided right after a drill bit 400db of the drill string 400. A second calliper tool 100-2 is provided right after a bottomhole assembly 400bh. This could be at a distance of 20 meters from the drill bit 400db. The drill string 400 further comprises a plurality of drill string segments 400s as illustrated. At a distance of 500 m from the drill bit, there is provided a third calliper tool 100-3. The drill string 400 is suspending to a top drive 255 that is coupled to the hoisting block 260 at the top of the derrick 250.

During a run in the well the downhole calliper tools 100-1, 100-2, 100-3 send their registered data (measurements) to a telemetry logging data sampler 500, which on its turn is connected to a logging computer 511 via a connection 510 (which might be a wireless communication channel). The computer 511 may store all data on a storage medium 512.

The impulse radar units may be initialized at surface or while the drill string is lowered down. The initialization can be done through a cable or wireless. The signals from the impulse radar units can be sent real time through telemetry and/or it can be stored in internal memory. The data can be used in an autonomous drilling system where actions are taken based on the calliper data about hole size, derived (change/time) of the hole size or the double derived (change/time$^2$).

Figure 6:
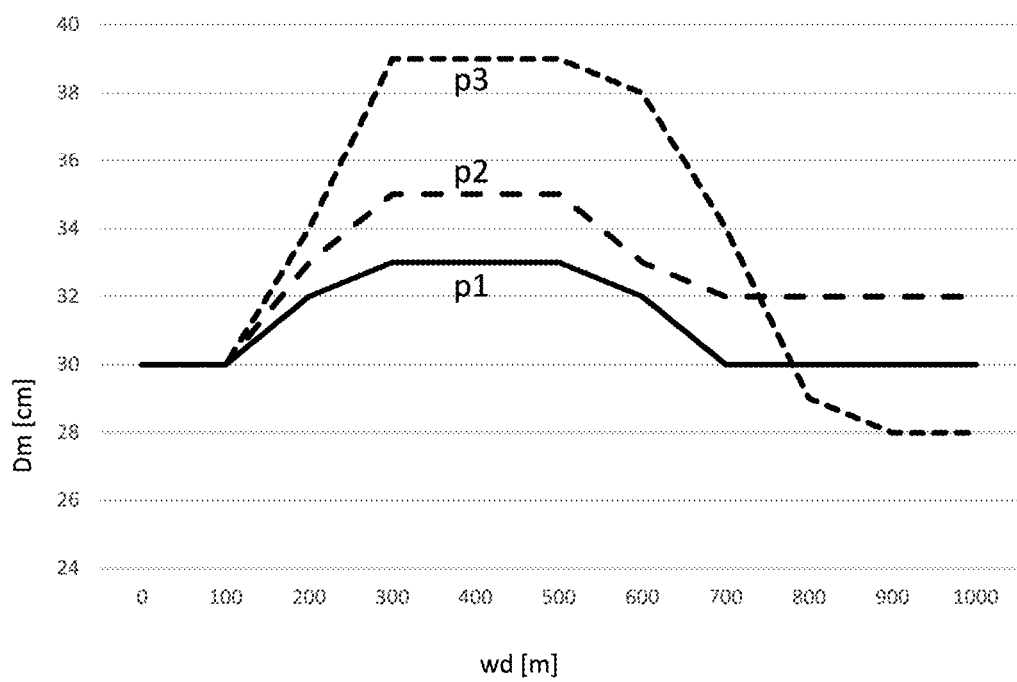
FIG. 6 shows the result of a logging operation using the set-up of FIG. 5.
Figure 7:
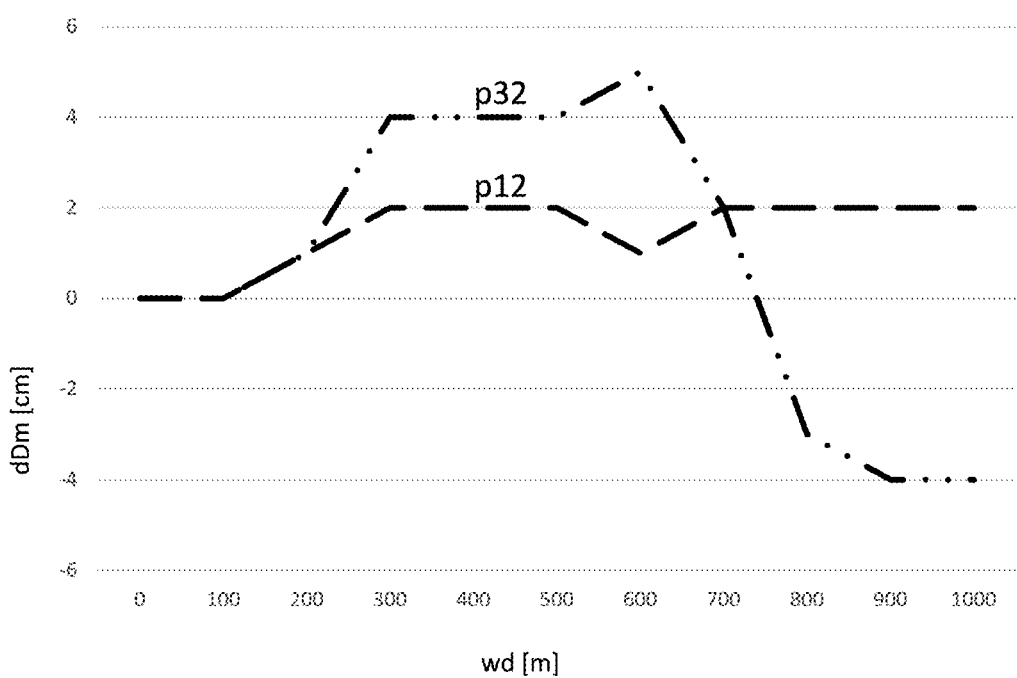
FIG. 7 shows how other information may be derived from the results of FIG. 6.

FIG. 6 shows the result of a logging operation using the set-up of FIG. 5. The figure shows for each of said calliper tools 100-1 . . . 100-2 a curve that shows the determined bore hole diameter Dm as a function of depth (in the well) wd. The first curve p1 comes from the measurements of the first calliper tool 100-1 at the drill bit, the second curve p2 comes from the measurements of the second calliper tool 100-2 at 20 m from the drill bit, and the third curve p3 comes from the measurement of the third calliper tool 100-3 at 500 m from the drill bit. FIG. 7 shows how other information may be derived from the results of FIG. 6. This figure illustrates the change in bore hole diameter dPm as a function of depth wd. This is determined by calculating the difference between the second curve p2 and the first curve p1 giving the first difference curve p21 in FIG. 7. Furthermore, the difference between the third curve p3 and the second curve p2 gives the second difference curve p32 as illustrated.

The example curves p1 ... p3, p21, p32 clearly show a washout effect between 100 m and 700 m-750 m depth, i.e. each subsequent calliper tool measure a larger diameter at the specific depth. Above 750 meter depth there is visible a small collapsing effect, wherein the third calliper tool 100-3 measure a diameter that is smaller than those measured by the other two calliper tools 100-1, 100-2.

Expressed in different words, the embodiment disclosed here is about the use of multiple impulse radar downhole calliper tools in a drill string where the measurements from the various calliper tools are taken at different time but correlated to the same depth and compared. The measurement and the change of the measurement over time will be used to quantify the internal diameter and shape of the wellbore and how they change over time. This information can be used to quantify the stability/change of the borehole size as a function of time and/or correlated against other factors effecting the well, for example change in drilling mud specifications. This information can be processed and incorporated in an autonomous drilling control system (either placed at the surface or integrated as a part of the downhole drilling equipment). The information can either be sent to surface real time during drilling or tripping, through a drill string telemetry system for example mud pulse, acoustic telemetry or wired pipe. Alternatively, the information can stored in memory and read when the sensor comes to surface after drilling and tripping.

In contrast with the embodiments discussed in the previous paragraph it is also possible to correlate data from one downhole calliper tool, sampled at different time instants, to the same depth. By way of example, the downhole calliper tool can be used for measuring while drilling (on the way down in the well), and it can be used again while lifting the equipment out of the well. The results out of these two runs can be compared for each depth. This also illustrates another advantage of the downhole calliper tool of the invention, in comparison with for instance acoustic sensors. Acoustic sensors are not able to perform measurements with enough resolution (samples/meter) at such high tripping rates. The downhole calliper tool of the invention, however, then still provides high resolution.

With reference to the detailed to description of the figures it is summarized that in one aspect the invention is about use of one or multiple impulse radar sensors that sample at multiple depth in an oil well with the purpose of giving a distance measurement of the well's internal diameter. This can either be done with one impulse radar transmitter that sends one pulse and where the receiver, clockless, rapidly samples the reflected signal. The receiver can for example sample 256 samples, each sampling reflections at a predefined time, giving a predefined distance, from which the reflection comes from. Alternatively, this can be done with multiple impulse radar sensors, for example 256, that each transmits and receives a signal, each set up to measure reflections at a predefined time, giving a predefined distance, from which an reflection can come from.

The downhole calliper tool of the invention may sample at a high sample rate and give excellent accuracy. Furthermore, the technology may be based on modern integrated circuits, which reduces power consumption and size. This allows the sensors to easily be integrated several places in the drill string, where it will give rapid and accurate measurements. Since the measurements are based on electromagnetic signals it will require less processing than the commonly used acoustic signal, which is highly affected by downhole parameters as mud density, pressure, vibrations and temperature.

In an embodiment the downhole calliper tool may use clockless measuring at multiple investigation depth d1 ... d4 by utilizing modern electronics, for example radar sensors based on the Continuous Time Binary Value (CTBV) principle. Sampling clockless on multiple depths, allows the high sample rate and accuracy, and still maintain a low current consumption and size of the sensors. A typical sample rate will be 10 samples/second or better, while the impulse radar sensor itself will operate in the GHz range.

The impulse radar based calliper tool may be placed at multiple places in a drill string. This allows continuously monitoring of the formation and it will be possible to spot trends and rate of changes in the bore hole size and shape. This can be incorporated in an autonomous drilling control system. Since the sensors samples at the high rate, the vertical sample resolution (distance between each sample point) while tripping or reaming, either in or out of the hole, will be more than fulfil todays logging requirements.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage. The invention may be implemented by means of hardware comprising several distinct elements, and by means of a suitably programmed computer. In the device claim enumerating several means, several of these means may be embodied by one and the same item of hardware.

The invention claimed is:

1. A downhole calliper tool for measuring distance between the calliper tool and an interface in a well, the downhole calliper tool comprising:
    an impulse radar system comprising a high bandwidth radar based upon a continuous time binary value design, the impulse radar system comprising at least one impulse radar unit configured for:
    a) transmitting electromagnetic pulses with the impulse radar unit in a direction away from the downhole calliper tool,
    b) receiving reflections of said electromagnetic pulses with the impulse radar unit, and
    c) analysing said reflections to determine the distance between the impulse radar system and the interface, wherein the impulse radar system is designed for carrying out at least one distance determination per second.

2. The downhole calliper tool according to claim 1, wherein the impulse radar system is configured for determining distances to multiple interfaces that are located in the petroleum well behind each other.

3. The downhole calliper tool according to claim 1, wherein the impulse radar system is configured for determining distances to said multiple interfaces by transmitting electromagnetic pulses having a predefined fixed frequency followed by determining respective distances to each of said respective interfaces by analysing the reflections within a predetermined time window complying with a predetermined time-of-flight of the electromagnetic pulses, wherein the predetermined time-of-flight complies with a predefined distance between the impulse radar system and the respective interface.

4. The downhole calliper tool according to claim 1, wherein the impulse radar system is configured for determining distances to said multiple interfaces by transmitting electromagnetic pulses having different predefined frequencies followed by determining respective distances to each of said respective interfaces by analysing the reflections within different predetermined frequency spectrums complying with the predefined frequencies of the electromagnetic pulses, wherein each of said predefined frequencies is selected for a different interface.

5. The downhole calliper tool according to claim 1, wherein the impulse radar system comprises a plurality of impulse radar units distributed around the circumference of the downhole calliper tool, each impulse radar unit being configured for measuring distance of respective interfaces in a different radial direction respectively.

6. The downhole calliper tool according to claim 1, wherein the impulse radar system comprises a further plurality of further impulse radar units distributed over the length of the downhole calliper tool, each impulse radar unit being configured for measuring distance of respective interfaces.

7. The downhole calliper tool according to claim 1, wherein each impulse radar unit comprises one transmitter-receiver for transmitting said electromagnetic pulses and receiving said reflections.

8. The downhole calliper tool according to claim 1, wherein each impulse radar unit comprises a plurality of transmitter-receivers for transmitting said electromagnetic pulses and receiving said reflections, each transmitter-receiver being configured for detection of at least one of said interfaces.

9. The downhole calliper tool according to claim 1, deployed in at least one of: a drill-string, a downhole tractor, a wireline downhole tool, a slickline downhole tool, an MWD tool, a rotary steerable tool, a reamer, a hole opener and a mud motor.

10. The downhole calliper tool according to claim 1, wherein the electromagnetic pulses are transmitted in radial directions away from the downhole calliper tool.

11. The downhole calliper tool according to claim 1, wherein the downhole calliper tool further comprises a control module, a memory for storing measurements, and power supply.

12. The downhole calliper tool according to claim 1, wherein the measured distances at a certain depth are calculated back to an actual diameter or shape at said depth.

13. The downhole calliper tool according to claim 1, wherein all measurements are logged versus the actual depth, versus time or both.

14. A drill string comprising at least one downhole calliper tool for measuring a downhole calliper tool for measuring distance between the calliper tool and an interface in a well, the downhole calliper tool comprising:
an impulse radar system comprising a high bandwidth radar based upon a continuous time binary value design, the impulse radar system comprising at least one impulse radar unit configured for:
a) transmitting electromagnetic pulses with the impulse radar unit in a direction away from the downhole calliper tool,
b) receiving reflections of said electromagnetic pulses with the impulse radar unit, and
c) analysing said reflections to determine the distance between the impulse radar system and the interface, wherein the impulse radar system is designed for carrying out at least one distance determination per second.

15. A method of operating a downhole caliper tool system, comprising:
lowering a hollow tool body into an earth formation during a drilling operation, the hollow body having a first threaded end configured to couple to a first drill pipe segment and a second threaded end configured to couple to a second drill pipe segment;
determining a first diameter of a first interface of the earth formation at a predetermined depth using a control module operatively coupled to a plurality of continuous time binary value (CTBV)-type impulse radar units spaced apart from each other in a radial pattern about a circumference of the hollow tool body;
raising or lowering the hollow tool body in the earth formation;
determining a second diameter of the first interface the earth formation at the predetermined depth using the control module operatively coupled to the plurality of CTB V-type impulse radar units; and
incorporating a comparison of the first diameter and the second diameter into an operation of an autonomous drilling control system.

16. The method of claim 15, wherein each of the plurality of CTBV-type impulse radar units comprises a transceiver and a receiver, and wherein determining the first diameter and the second diameter comprises:
operating each transceiver to emit a plurality of electromagnetic pulses toward the first interface of the earth formation at the predetermined depth;
operating each receiver to receive a plurality of reflections of the plurality of electromagnetic pulses; and
analyzing the plurality of reflections to determine a distance between each of the plurality of CTBV-type impulse radar units and the interface.

17. The method of claim 16, wherein the method further comprises:
determining a first diameter of a second interface of the earth formation at the predetermined depth using the control module operatively coupled to the plurality of CTB V-type impulse radar units;
wherein the second interface is located radially outward from the first interface and the control module operates each transceiver to emit a plurality of electromagnetic pulses that penetrate the first interface before reaching the second interface.

* * * * *